Dec. 26, 1939.　　A. F. DITTMER　　2,184,415
PROJECTOR
Filed Sept. 21, 1938　　2 Sheets-Sheet 1
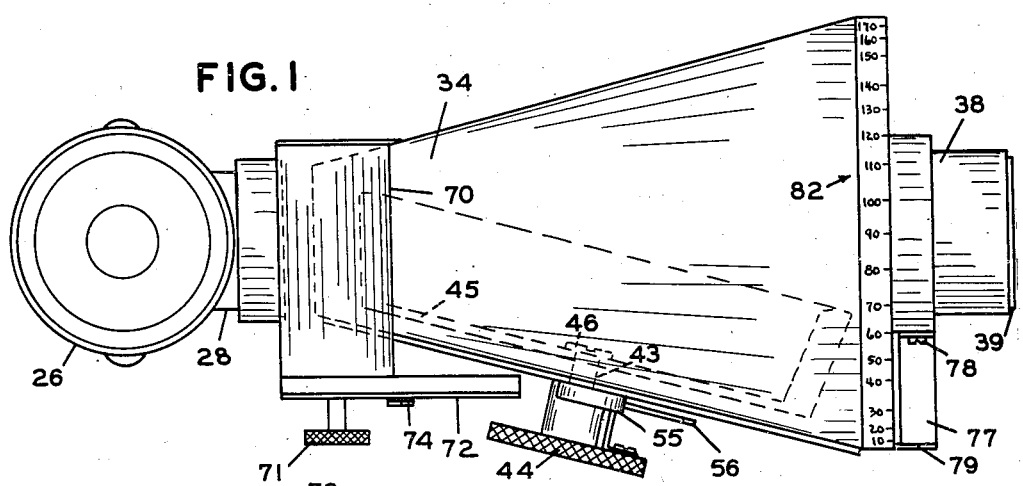
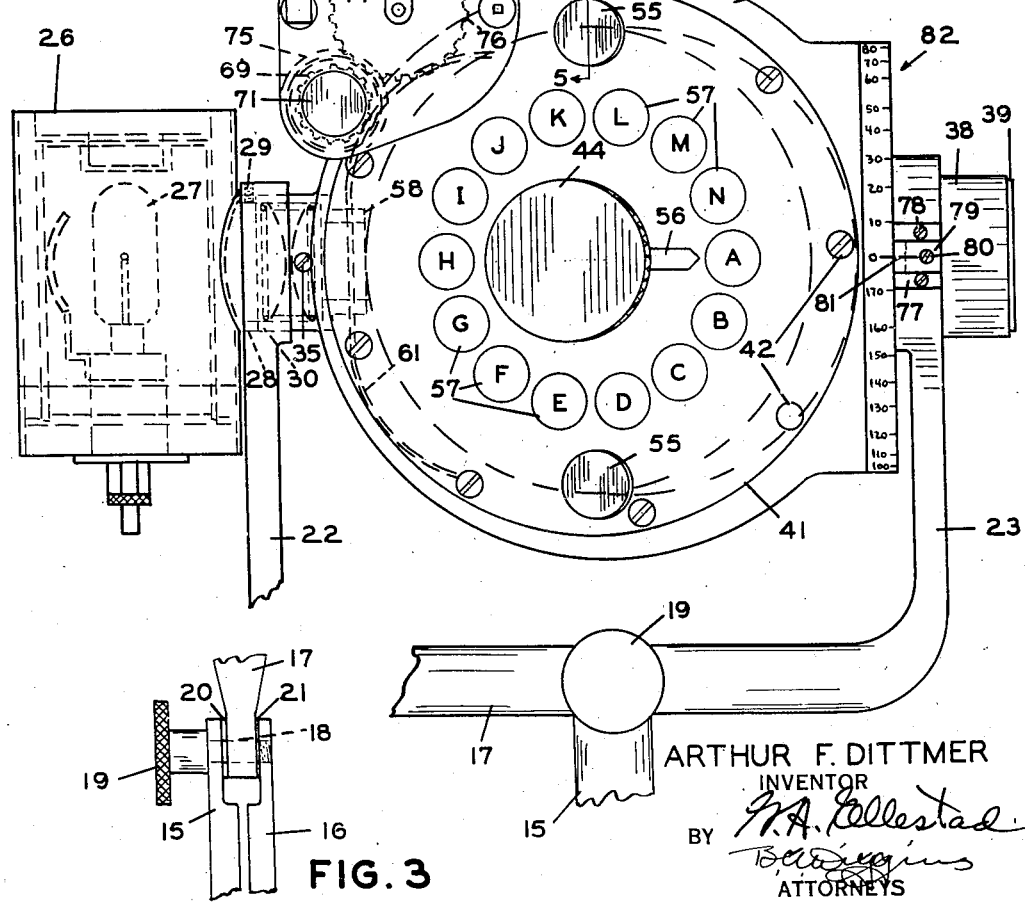
ARTHUR F. DITTMER
INVENTOR
BY
ATTORNEYS Dec. 26, 1939.  A. F. DITTMER  2,184,415
PROJECTOR
Filed Sept. 21, 1938  2 Sheets-Sheet 2
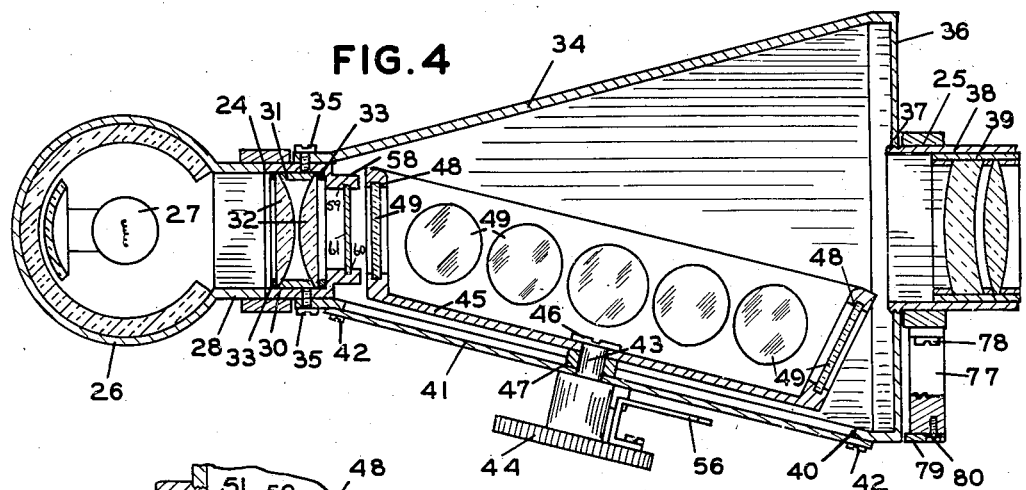
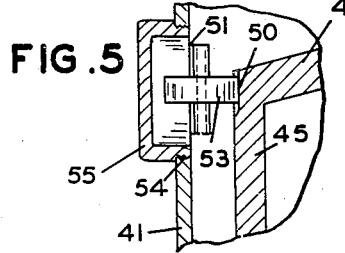
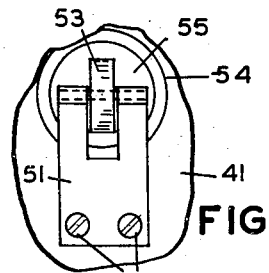
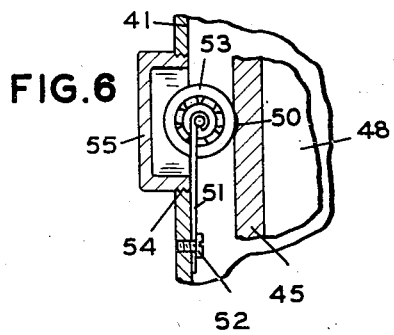
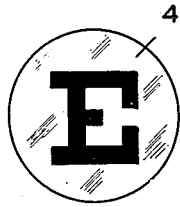
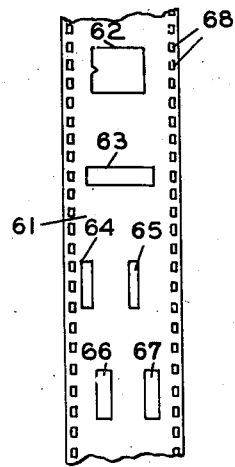
ARTHUR F. DITTMER
INVENTOR
BY
ATTORNEYS Patented Dec. 26, 1939

2,184,415

UNITED STATES PATENT OFFICE 2,184,415

PROJECTOR

Arthur F. Dittmer, Rochester, N. Y., assignor to Bausch & Lomb Optical Company, Rochester, N. Y., a corporation of New York Application September 21, 1938, Serial No. 231,005

7 Claims. (Cl. 88—20)

The present invention relates to optical projection apparatus and more particularly to optical projection apparatus for determining the kind and amount of visual defects in eyes.

One of the objects of the present invention is to provide a projection apparatus which is simple and inexpensive to manufacture yet efficient and convenient in operation. Another object is to provide a visual acuity testing projector having a plurality of test objects each of which can be rotated in its own plane. Still another object is to provide a projection apparatus in which the slide changing apparatus is bodily rotatable about the optical axis. These and other objects and advantages reside in certain novel features of construction, arrangement and combination of parts as will hereinafter be more fully set forth and pointed out in the appended claims.

Referring to the drawings:

Fig. 1 is a top plan view of a projector according to my invention.

Fig. 2 is a side elevation thereof.

Fig. 3 is a fragmentary front elevation of the inclination joint.

Fig. 4 is a horizontal section through my new projector.

Fig. 5 is a section of the detent mechanism taken on line 5—5 of Fig. 2.

Fig. 6 is a section of same taken at right angles to the section shown in Fig. 5.

Fig. 7 is a fragmentary elevation of same from the inside of the housing.

Fig. 8 is a detail view of one of the slides.

Fig. 9 is a detail view of the diaphragm strip.

One embodiment of the present invention is illustrated in the drawings wherein an upright base is bifurcated at its top providing two lugs 15 and 16 spaced to receive the support 17. A hinge pin 18 having an enlarged knurled head 19 extends through the lug 15 and support 17 and is threaded into the lug 16. By turning the head 19, the lugs 15 and 16 are drawn together and clamp the support 17 between two washers 20 and 21.

The support 17 is formed with two substantially parallel upstanding arms 22 and 23, one at each end. The arm 22 has a cylindrical bearing aperture 24 at its top and the arm 23 has a similar cylindrical bearing aperture 25 in axial alignment with the aperture 24.

A lamp house 26 carrying a lamp 27 is formed with a forwardly projecting tube 28 which is secured in the aperture 24 by a set screw 29. The actual construction of this lamp house forms no part of the present invention and any desired lamp house could be used. Forwardly of the tube 28, a sleeve 30 is rotatably journalled in the aperture 24 and a lens cell 31 carrying condensing lenses 32 is suitably secured within the sleeve 30, as for example, with spring rings 33, for concentrating the light from the lamp 27 and directing it along the optical axis.

A housing 34 is secured to the sleeve 30 by screws 35 and projects forwardly toward the arm 23. The front wall 36 of the housing 34 has a threaded opening 37 in which a sleeve 38 is securely threaded. This sleeve 38 is rotatably journalled in the bearing aperture 25 in the arm 23. An objective lens indicated at 39 is slidably mounted within the sleeve 38.

One side wall of the housing 34 is formed with an opening 40 and a cover plate 41 is secured over the opening 40 by screws or bolts 42. A shaft 43 provided with an enlarged knurled head 44 is rotatably journalled in the cover plate 41 and a slide carrying disk 45 is secured on the shaft 43 within the housing 34 by a screw 46 and held in spaced relation to the cover plate 41 by a spacing washer 47. As shown in Figs. 1 and 4, the housing 34 tapers outwardly from the sleeve 30 and the cover plate 41 and slide carrier 45 are spaced from and at an angle to the optical axis of the lamp 27, condenser 32 and objective 39.

A series of slide holders 48 project outwardly from the slide carrier disk 45 at an angle equal to the angle between the disk 45 and the optical axis so that one slide holder extends substantially across the optical axis at the object plane of the objective 39 as shown in Fig. 4. Each slide holder carries a slide 49 and these slides carry suitable indicia for determining the character and amount of visual defects. For example, the slide 49 shown in Fig. 8 carries the letter E constructed as is known in the art of visual testing. Other slides would carry such indicia as T-charts, astigmatic charts, red-green charts, illiterate charts, juvenile charts or other suitable charts well known in the art.

In order to insure proper positioning of the slides 49 in the object plane of the objective 39, the carrier disk 45 is formed with a plurality of notches 50, one for each disk. A leaf spring 51 secured at one end to the cover plate 41 by screws 52 carries a ball bearing roller 53 at its free end. This roller 53 engages in the notches 50 to afford a positive stop when a slide 49 is in projecting position and is practically frictionless when the disk 41 is in motion. A hole 54 in the cover plate 41 permits free movement of the roller 53 and this hole is covered by a suitable cap 55.

An index pointer 56 is fixed to the operating knob 44 outside the housing 34 and cooperates with a series of marks 57 which indicate to the operator which slide 49 is in projecting position. Preferably both the slides 49 and the corresponding marks 57 are readily replaceable so that the owner may insert new slides as the occasion requires.

It is also frequently desirable in testing for visual defects to vary the size, shape and location of projected portion of the slide. In other words, the operator might wish to project only a single character from the slide or he might wish to project a single horizontal or vertical row of characters. I prefer to accomplish this by varying the area of illumination on the slide. The mechanism for doing this is illustrated in Figs. 1, 2, 4 and 9.

The sleeve 30 has a portion 58 which projects forwardly from the lenses 32 and this portion 58 has two parallel vertical slots 59 and 60 which serve as guides for a thin, resilient and preferably metallic ribbon 61. This ribbon 61 is formed with a plurality of apertures such as those indicated at 62, 63, 64, 65, 66 and 67 in Fig. 9. The apertures 63, for example, will permit the operator to select different horizontal rows of test characters and the apertures 64 and 65 permit the selection of spaced vertical rows of test characters as, for example, to perform a red-green test.

The metal ribbon 61 is preferably provided with a row of sprocket holes 68 on each side for engagement with a sprocket 69 rotatably mounted in a casing 70 at the rear of the housing 34. A knob 71 projecting out from the casing 70 permits actuation of the sprocket 69. A dial plate 72 having indicia 73 showing the various apertures in the ribbon 61 is secured on the casing 70 and a pointer 74 rotatably mounted on this plate and connected to the sprocket 69 by gears 75 and 76 indicates on the dial plate the particular aperture in operative position in the light beam.

In order to determine the axis and amount of an astigmatic refractive error, the operator would move a suitable astigmatic chart such as a T-chart, into projecting position by means of the knob 44. The housing 34 and sleeves 30 and 38 are then rotated about the optical axis in the bearing apertures 24 and 25 until the projected image of the slide is in the angular position of best and worst vision. A bracket 77 is fixed to the arm 23 by screws 78 and extends outwardly to the edge of the housing 34. A plate 79 is secured on the end of the bracket 77 by a screw 80 and an index mark 81 on the plate 79 extends to the outside edge of the front part of the housing 34. This edge is graduated in degrees as indicated generally at 82 and thus the angular position of the housing 34 and hence of the image of the test slide is readily determined.

The rotatable mounting of the housing not only simplifies tests for astigmatism but also provides the means for readily testing children or illiterates. For example, the E shown in Fig. 8 can be very readily projected in any orientation or in successively different orientation in accordance with the known method of testing in such cases. Heretofore it has been necessary to provide a chart with a large number of characters in different orientations but in my new projector a single test character on the slide will be adequate.

From the foregoing, it will be apparent that I am able to attain the objects of my invention and provide a simple, rugged, efficient and inexpensive projection apparatus. Various modifications can, of course, be made without departing from the spirit of my invention or the scope of the appended claims.

I claim:

1. A projection apparatus comprising a support having two spaced aligned bearings, a lamp house carried by one bearing, a lamp in said lamp house for projecting light through said bearings, a hollow housing rotatably journalled at one end in said one bearing, a tube rotatably journalled in the other bearing, means for securing said tube to said housing, an objective lens carried by said tube and a slide changing mechanism mounted in said housing.

2. A projection apparatus comprising a support having two spaced aligned bearings, a lamp house carried by one bearing, a lamp in said lamp house for projecting light through said bearings, a hollow housing rotatably journalled at one end in said one bearing, a tube rotatably journalled in the other bearing, means for securing said tube to said housing, an objective lens carried by said tube, a multiple slide carrier rotatably mounted within said housing, a plurality of slides mounted on said slide carrier, means for rotating said slide carrier for selectively positioning one or another of said slides in the object plane of said objective, means for rotating said housing about the optical axis and means for indicating the angular position of said housing.

3. A projection apparatus for ophthalmic testing comprising a support, a housing rotatably mounted on said support, a source of light carried by said support at one end of the housing for projecting light along the axis of rotation of said housing, an objective lens carried by said support at the other end of the housing so that its optical axis coincides with the axis of rotation of said housing, a slide carrier rotatably mounted in said housing in spaced relation to the optical axis and at an angle thereto, a plurality of slide holders mounted on said slide carrier at the same angle as that between the carrier and the optical axis, ophthalmic test slides in the slide holders, means for rotating the slide carrier to bring different slides into the object plane of the objective, means on the housing for indicating which slide is in said object plane, means for rotating the housing on its axis and means for indicating the angular position of the housing relative to said support.

4. A projection apparatus for ophthalmic testing comprising a support, a source of light carried by said support, an objective lens carried by said support in alignment with and spaced from said source of light, a housing carried by said support between said source of light and said objective, said housing being rotatably mounted for rotation about the optical axis of said objective, a disk rotatably mounted in said housing at an angle to and spaced from the optical axis of said objective, a plurality of slide holders carried by said disk, and ophthalmic test slides in said slide holders, said slide holders diverging outwardly from said disk at the same angle as that between the disk and the optical axis, said disk being so located that one slide holder extends substantially perpendicularly across the optical axis at the object plane of the objective.

5. A projection apparatus for ophthalmic testing comprising a support, a source of light carried by said support, an objective lens carried by said support in alignment with and spaced from said source of light, a housing carried by said support between said source of light and said objective, said housing being rotatably mounted for rotation about the optical axis of said objective, a disk rotatably mounted in said housing at an angle to and spaced from the optical axis of said objective, a plurality of slide holders carried by said disk, said slide holders diverging outwardly from said disk at the same angle as that between the disk and the optical axis, said disk being so located that one slide holder extends substantially perpendicularly across the optical axis at the object plane of the objective, a plurality of ophthalmic test slides in said slide holders and means for rotating said housing about the optical axis to change the angular position of the slide holder in said object plane and means for indicating said angular position.

6. A projection apparatus comprising a support, an upstanding arm carried by said support and having a bearing aperture at its upper end, a lamp house, a projecting tube on said lamp house secured in said aperture, a lamp in said lamp house for projecting light through said tube, a sleeve rotatably journalled in said aperture, condensing lenses mounted in said sleeve, a housing secured to said sleeve and projecting forwardly therefrom, a second upstanding arm carried by said support beyond the forward end of said housing and having a bearing aperture therein in axial alignment with the aperture in the first arm, a second sleeve rotatably journalled in the aperture in the second arm, said housing being fixed at its forward end to said second sleeve, an objective lens in said second sleeve, and means in said housing for supporting an object slide in the object plane of said objective.

7. A projection apparatus comprising a support, an upstanding arm carried by said support and having a bearing aperture at its upper end, a lamp house, a projecting tube on said lamp house secured in said aperture, a lamp in said lamp house for projecting light through said tube, a sleeve rotatably journalled in said aperture, condensing lenses mounted in said sleeve, a housing secured to said sleeve and projecting forwardly therefrom, a second upstanding arm carried by said support beyond the forward end of said housing and having a bearing aperture therein in axial alignment with the aperture in the first arm, a second sleeve rotatably journalled in the aperture in the second arm, said housing being fixed at its forward end to said second sleeve, an objective lens in said second sleeve, means in said housing for supporting an object slide in the object plane of said objective, means for rotating said housing on said sleeves, and means for indicating the angular position of said housing relative to said support.

ARTHUR F. DITTMER.